United States Patent [19]

Kovács

[11] Patent Number: 5,974,951
[45] Date of Patent: Nov. 2, 1999

[54] APPARATUS AND DOUGH MAKING UNIT FOR PREPARING FRIED POTATO PRODUCT FROM DEHYDRATED POTATO

[76] Inventor: László Kovács, 1310 E. Ocean Blvd., Long Beach, Calif. 90802

[21] Appl. No.: 09/084,437

[22] Filed: May 27, 1998

Related U.S. Application Data

[62] Division of application No. 08/662,110, Jun. 14, 1996, Pat. No. 5,759,601.

[51] Int. Cl.[6] .................................................... A47J 37/12
[52] U.S. Cl. ................................ 99/333; 99/357; 99/403; 99/334
[58] Field of Search .............................. 99/333, 332, 330, 99/357, 403, 334; 222/51, 64, 67, 80, 129.1, 129.2; 221/150 R, 250 HC, 150 A; 219/486, 492, 494

[56] References Cited

U.S. PATENT DOCUMENTS

| | | |
|---|---|---|
| 4,646,627 | 3/1987 | Bartfield et al. .......................... 99/330 |
| 4,694,742 | 9/1987 | Dover ........................................ 99/404 |
| 4,722,267 | 2/1988 | Galockin et al. ......................... 99/357 |
| 5,102,674 | 4/1992 | Lehman .................................... 426/233 |
| 5,189,944 | 3/1993 | Rasmussen et al. .................. 99/357 X |
| 5,272,961 | 12/1993 | Campbell et al. ......................... 99/353 |
| 5,352,866 | 10/1994 | Cartwright et al. .................. 99/330 X |
| 5,398,668 | 3/1995 | Daneshvar et al. .................. 99/330 X |
| 5,404,796 | 4/1995 | Campbell et al. ......................... 99/357 |
| 5,575,194 | 11/1996 | Maher, Jr. et al. ....................... 99/330 |
| 5,586,486 | 12/1996 | Nitschke et al. ......................... 99/330 |
| 5,605,091 | 2/1997 | Garber .................................. 99/357 X |

*Primary Examiner*—Reginald L. Alexander
*Attorney, Agent, or Firm*—Pennie & Edmonds LLP

[57] ABSTRACT

An automatic apparatus for delivering formed, freshly fried potato products from a dehydrated potato granulate. The apparatus includes a frying unit with a frying vessel, heating element, device for controlling dwell time of the potato product, and at least two temperature sensors. The apparatus also includes a control unit for controlling the frying time. The apparatus may also include a dough making unit having a fixed lower plate and a rotary device having four cups.

18 Claims, 2 Drawing Sheets

APPARATUS AND DOUGH MAKING UNIT FOR PREPARING FRIED POTATO PRODUCT FROM DEHYDRATED POTATO

CROSS-REFERENCE TO RELATED APPLICATIONS

This is a division of application Ser. No. 08/662,110, filed Jun. 14, 1996, now U.S. Pat. No. 5,759,601.

FIELD OF THE INVENTION

This invention relates to a novel process and automatic apparatus for delivering formed, freshly fried potato products from dehydrated potato granulate, either for individual consumers, or for high capacity catering purposes. The frying principle is different from that of the prior art solutions. With respect to the apparatus, a new dough making unit is also developed and suggested.

BACKGROUND OF THE INVENTION

Several attempts were made to develop an automatic apparatus for providing various fried potato products.

Galockin et al. taught, in U.S. Pat. No. 4,722,267, a french fry vending machine which dispensed four different types of food stuffs, prepared from frozen potatoes. The need for storing frozen food permitted quite limited use in this case.

Campbell et al., in U.S. Pat. No. 5,272,961, disclosed an apparatus for vending french potato strips. This machine operated using fine grain potato powder which was stored in a hopper. The upper part of the machine required refrigeration for controlling humidity of the fine grain powder and for avoiding problems otherwise encountered with dispensing the powder. Similarly, a mixing mechanism (86) was also needed to ensure sufficient homogeneity of the rehydrated dough.

Dover, in U.S. Pat. No. 4,694,742, disclosed an automatic deep fat cooker. The intermediate dough was made of dehydrated potato powder. Dover noted that this method is very sensitive to deviations in cooking parameters such as time and temperature. As far as the quality of the product, the frying oil was required to be strictly controlled. This, however, was not easy to carry out, especially under varying conditions.

SUMMARY OF THE INVENTION

It is an object of the present invention to provide an automatic system, which does not require frequent inspection, for producing formed potato pieces from dehydrated and granulated potato by the addition of water and a subsequent forming and frying operation.

Alternatively, it may be an object to provide a machine for use in applications where high output capacity is required, for instance in kitchens.

It is a further object of the invention to find a frying process for providing consistently good quality fried products.

This object is achieved by a process for preparing fried potato product from dehydrated potato which is carried out in successive cycles. The process comprised the steps of:
preparing portions of dough by adding water to a dehydrated granulated potato,
forming portions of dough into predetermined shapes,
making pieces of formed dough by performing a series of consecutive transversal cuttings,
frying the formed pieces in edible frying oil received in a vessel which is heated by controlled electric power;
controlling the dwell time of the formed pieces in the frying oil as frying time in each cycle;
measuring the temperature of the frying oil during the frying time,
computing an introduced energy amount with the use of a control unit for integrating the temperature of the frying oil on the frying time,
terminating the frying time when the introduced energy amount becomes equal to or first exceeds a predetermined constant value, and
removing the formed and fried pieces from the frying oil upon termination of the frying time.

Furthermore, an automatic apparatus is provided for delivering fried potato products from a dehydrated potato granulate product prepared by addition of water in successive cycles. The apparatus includes a frying unit equipped with a frying oil contained in a frying vessel with a heating element to heat the frying oil by controlled electric power. The frying unit controls the dwell time of the rehydrated potato product in the frying oil as frying time in each cycle. The apparatus further includes:
at least two temperature sensors located at different height levels inside the frying vessel of the frying unit; and
a control unit to average the signals of the temperature sensors during frying time and to integrate the averaged temperature of the frying oil on a frying time, and thereby computing the amount of the introduced energy.

The control unit interrupts the frying when the computed introduced energy amount becomes equal to or first exceeds a predetermined constant value.

Furthermore, the invention relates to a dough making unit for use in an apparatus for delivering fried potato products from dehydrated potato granulate. The dough making unit includes a fixed lower plate and a rotary means provided with four cups uniformly spaced around the rotary axis of the rotary means, having four positions allocated to consecutive procedural steps of preparing dough. The rotary means is further provided with a rotating mechanism to forward the cups to a subsequent position by one quarter turn. The cups slip on the upper surface of the fixed lower plate, which constitutes the bottom of the cups, except in the fourth position. In the first position, the cups are filled with dehydrated potato granulate by a granulate metering mechanism. In the second position, the granulate is rehydrated by adding water to the granulate by a spraying means. In the third position, the rehydrated granulate is pressed to obtain its higher density by a preforming press. In the fourth position, the dough of the rehydrated granulate is pressed in several phases through a press mold by a cutting press, and the protruding pieces of dough are cut down after each phase by a knife unit.

BRIEF DESCRIPTION OF THE DRAWINGS

An embodiment of an automatic apparatus realizing the frying process according to the invention will now be described by way of example with reference to the accompanying drawings. However, it should be noted that this is not to be construed as limiting to the scope of the invention.

DETAILED DESCRIPTION OF THE DRAWINGS

Figure 1:
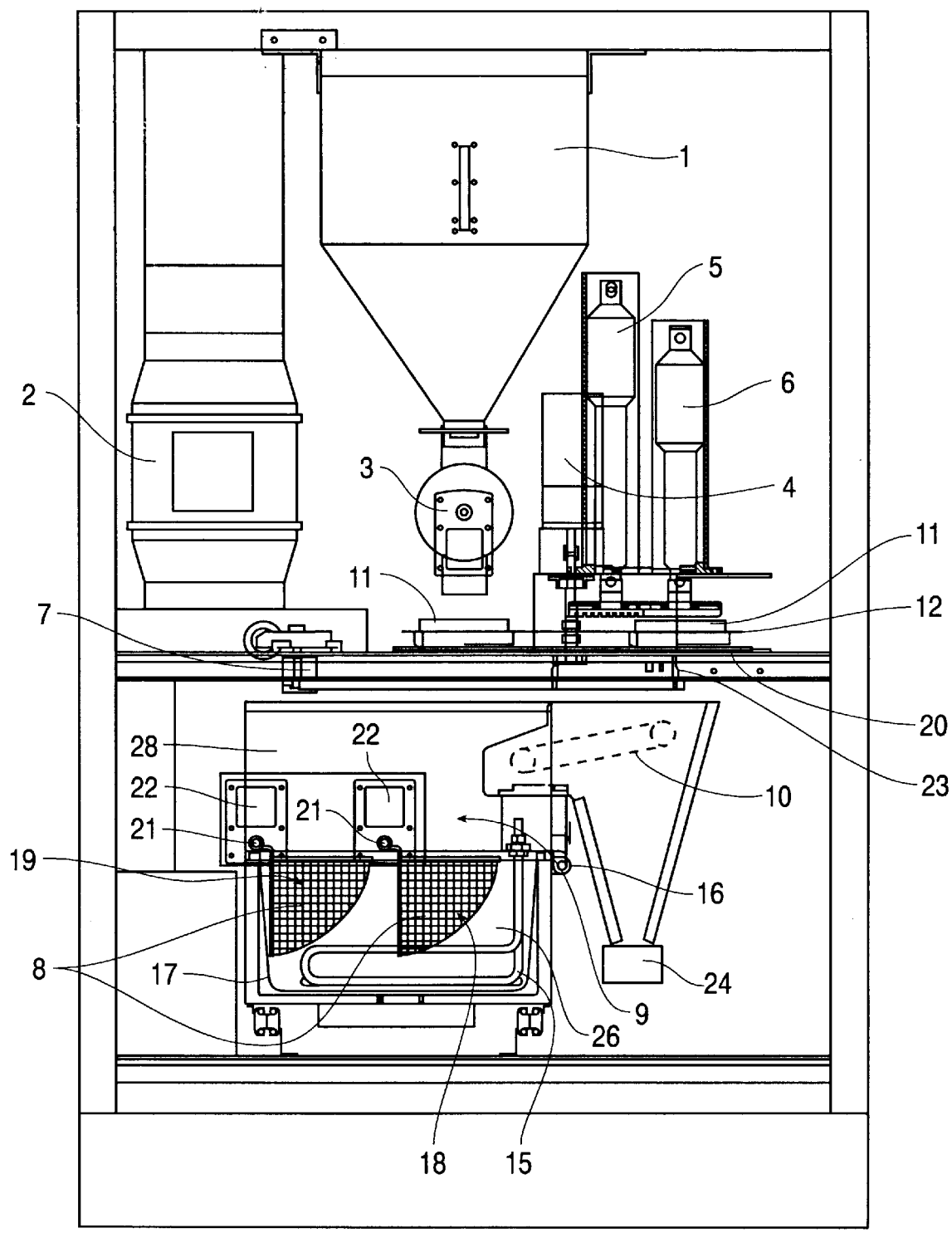
FIG. 1 is a front view of an embodiment of the automatic potato frying apparatus according to the invention.

An illustrative embodiment of the automatic frying apparatus is shown in FIG. 1 in front view, as an example.

This apparatus includes a granulate container 1, a ventilator 2, a granulate metering mechanism 3, a main motor 4, a cutting press 5, a preforming press 6, a knife unit 7, frying baskets 8, a frying unit 9, a conveyor belt 10, and several forming cups 11. A possible arrangement of these functional elements can be identified in FIG. 1.

Granulate container 1 serves for the storage of the starting potato product, that is the potato granulate. Use of granulate has the advantage that high air humidity will not make the stocked granulate lumpy. A fine grain powder, which was used in most of the known prior art machines, had a tendency to get lumpy or to become cemented together, which would affect dispensing of a portion from the stocked material. The granulate container 1 is made of a material generally admitted in the food industry. For facilitating the manipulation, there can optionally be provided means for visually checking the level of the granulate in the container 1. Preferably a window can be used.

The granulate metering mechanism 3 comprises three uniform racks and is constructed from vanes rotating about a horizontal axis. The rotating part is placed within a round housing having an inlet opening and an outlet opening. The mechanism 3 is driven by a motor which is not separately shown. In operation, the mechanism 3 acts like a bucket wheel and transports downwardly one portion of granulate in each single cycle. Measurement of the granulate takes place during each 120° rotation of the rotating part around the axis. Each space between the vanes gets filled fully with granulate and is moved by its own weight. During the rotation, the granulate which was previously filled into the space between the vanes in a pre-determined volume flows out through a lower outlet opening. An optoelectrical sensor may be preferably used to monitor the operation of the apparatus and for putting the apparatus out of service or sending a signal to the control unit when the apparatus is running out of the granulate. The sensor may be placed at the inlet of the metering mechanism 3.

A dough making unit has been adapted to make a formed portion of potato from the dehydrated potato granulate. Its two main components are a lower plate 20 and a rotary means 12. The lower plate 20 remains in a still position, while the rotary means 12 forwards cups 11 slipping on the upper surface of the lower plate 20.

The round cups 11 are preferably made of stainless steel and fastened to the rotary means 12. The use of this material also facilitates cleaning. Cups 11 comprise a ring shaped portion having a cylindrical inner space. The ring shaped portion is closed at its bottom side by tightly joining it to the lower plate 20, which, however, has a finely polished plane upper surface on which the cups 11 slip by rotation of rotary means 12. In this way the lower plate 20 constitutes the bottom of the cups 11 slipping thereon.

Forwarding the cups 11 in steps can be advantageous since shaking of the dry granulate grains within the cups 11 makes the granulate level smooth. This can be realized while using a step-by-step motor drive 4.

Figure 2:
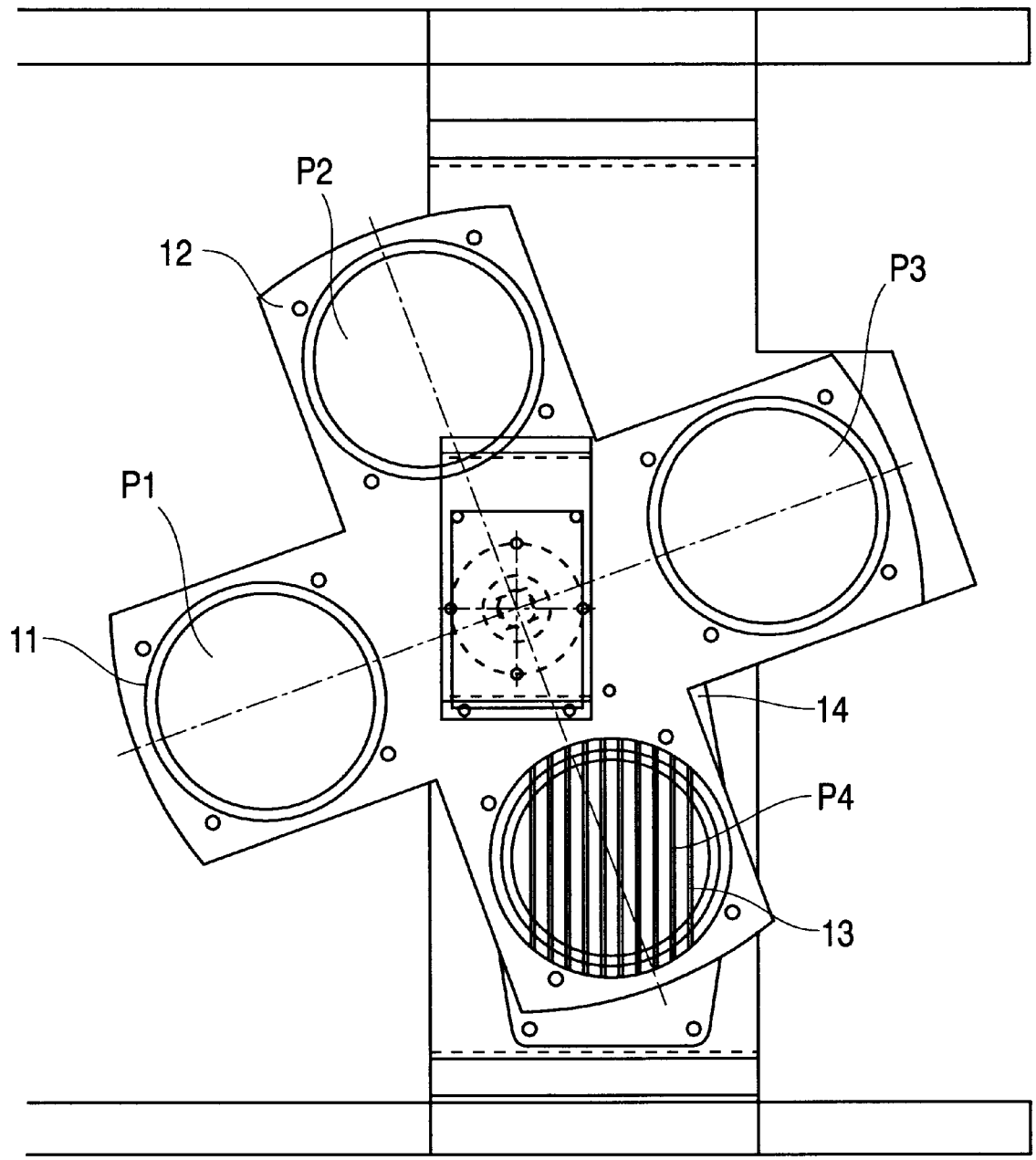
FIG. 2 is a bottom view of the rotary means of the dough making unit of said apparatus, as viewed from a lower plate, which is not shown.

In FIG. 2, the rotary means 12 including the cups 11 is illustrated in bottom view from the side of the lower plate 20, without indicating the latter. The automatic machine of the embodiment shown has four different procedural positions P1–P4 to carry out the required steps of making formed mass or dough pieces. All positions P1–P4 are arranged by equal angles, 90°, around a rotating axis of the rotary means 12. The lower plate 20 covers the bottom of the cups 11 in positions P1–P4 except the fourth one. In this fourth position P4, a press mold 13 is beneath the cup 11 to determine the final form of the product. In order to obtain enhanced output capacity the dough making unit is constructed to use four cups. Thus, the necessary four procedural steps can be done simultaneously in four distinct procedural positions P1–P4 according to FIG. 2.

In the first position P1, granulate is dispensed by the granulate metering mechanism 3. In this feeding position P1, the outlet opening of the granulate metering mechanism 3 is above the cup 11. The volume of granulate dispensed is smaller than the inner volume of a cup 11. In this way, the rim of the cup 11 prevents spreading of granulate grains.

The cup 11 with a portion of granulate is then moved to the next position P2 by the rotary means 12. This will be achieved by a rotation of 90°.

In this position P2, water in an optimal volume and temperature will be dispensed and added to the granulate through a valve. Water is supplied by a water system (not shown). It has been found that the actual volume of the water added to the granulate has a considerable influence over the quality of dough obtained. So quantitative measuring of the water is to be carried out with the greatest possible exactness. For that purpose, a circulated water flow circuit is used advantageously in the water system. Continuous circulation ensures that, in case of opening of the valves, the water volume circulated in the pipes is not accelerated. The acceleration of the water mass would introduce a non-linear proportionality between the opening duration of the valve and the amount of water dispensed. This non-linearity can be avoided with use of a water system in which permanently circulated water will be split into a side pipe with an outlet valve. This side pipe is very short, thus the included volume of the water to be accelerated is negligible.

At the end of the side pipe, a rehydrating head sprays warm water on the surface of the dispensed potato granulate in an amount according to the portion. The spraying time is controlled by a controlling means or control unit (not shown) such as a microcomputer. Fine spraying is important in order to avoid lumping of the resulting dough. In a preferred embodiment, the rehydrating head is a commonly used adjustable spraying valve which is fixed to spray downwards.

In the next position P3 the humid dough, prepared in such a way, undergoes a pressing step to obtain a higher density. For this reason, a preforming press 6 is mounted above the cup 11 in position P3. When this preforming press 6 is actuated the whole area of the cup 11 is pressed in a downward direction, while the bottom of the cup 11 containing the rehydrated granulate is kept closely covered by the lower plate 20.

Then, in the next position P4, the dough, compacted by pressure transferred by the preforming press 6, will be pushed through a press mold 13 which forms each piece, determining their length and width. The height of the pieces can be controlled by properly coordinating the movement of the press 6 pushing the dough through the press mold 13 and a knife unit 7, which will be mentioned later. The press mold 13 can be replaceable. Thus, various forms and shapes of the fried potato product can be obtained. In FIG. 2, a press mold 13 can be seen for pressing pieces of right prism shape. The press mold 13 in this case comprises tensioned, uniformly spaced parallel wires attached to a frame 14. This frame 14 is mounted in an aperture in the fixed lower plate 20 at position P4. When a cup 11 is forwarded to the cutting position P4, just above the press mold 13 in the lower plate 20, a cutting press 5 will be actuated. This cutting press 5 is provided with a flat or reliefed pressing plate at its lower end. The pressing plate is round and fits into the inner diameter of the cups 11.

The preferred embodiment of the dough making unit performs pressing of the prepared dough in several phases, and after each phase the knife unit 7 cuts down the protruded pieces of dough. Three, or more, phases can be advantageously applied. The cutting press 5 is actuated by an appropriate electromechanical actuator suitable to linearly move the pressing plate in adjustable length steps. Punctual stopping of the pressing plate in each phase is essentially important from the point of quality of consecutive frying. Therefore, the press 5 used for pushing the dough through the press mold 13 is preferably provided with an abutment or the like so as to stop the movement of the pressing plate of the cutting press 5.

The knife, included in the knife unit 7, is a tensioned stainless steel wire which is mounted on a frame 23. For the sake of enhanced stability, the knife preferably slides on a reinforcing arm, thus ensuring a minimal gap underneath the press mold 13, which is under cup 11 in position P4. The knife unit 7 operates with axial rotation when the wire knife cuts down the pieces of protruded dough.

Before starting up the cutting press 5, a conveyor belt 10 is activated and, during cutting, transfers the falling, formed pieces of semi-finished product into the frying unit 9. The conveyor belt 10 and its driving can be realized according to any construction known from the prior art. In the embodiment shown in FIG. 1, cutting is carried out inside or over the housing of conveyor belt 10, thus ensuring the removal of any possibly developing waste. The waste moves into the waste collecting container 24 located in the bottom part of the unit. Collection of the waste may be helped by an elastic rim (not shown) positioned near the edge of conveyor belt 10.

Frying unit 9 includes a lower 26 and an upper 28 part. These parts 26,28 are also referred to herein as lower 26 and upper 28 housings. The lower housing 26 is preferably heat-insulated and provided with a double casing. The upper part 28 may also be insulated, is so desired. In the lower housing 26 of frying unit 9, an oil containing frying vessel 17 is inserted, which vessel 17 is preferably corrosion resistant. In a preferred embodiment, the frying vessel 17 is made of stainless steel and equipped with an outlet valve. A heating unit 15, such as a heating wire, is preferably located in the lower part 26 within the frying vessel 17. In a preferred embodiment, the heating unit 15 is electric.

The upper part 28 is preferably mounted on a hinge 16 and attached to the lower insulated casing. As shown, the hinge is located on the right side of the frying unit 9. The moveability of the two units ensures the easy cleaning and maintenance of the frying unit 9. After turning out the upper casing 28 in which two baskets 8 are situated on motor driven rotating shafts 21, the baskets 8 can be lifted out for cleaning after releasing the fastening. By lifting out the baskets 8 and the electric heating unit 15, it is possible to remove the corrosion resistant frying vessel 17.

Two temperature sensors are preferably mounted inside the oil containing frying vessel 17 and serve to control the oil temperature. At the same time, they maintain the operating oil level in the frying vessel 17. The temperature sensors are preferably positioned at different height levels, thus ensuring not only the more reliable measurement of the frying oil temperature by averaging of two values measured on two locations, but on the principle of a significant difference observed between the two values, recognizable by continuous detection, the conclusion can be drawn that the oil level has dropped below the temperature sensor located higher. In that case frying oil can be added into the frying vessel 17 from a supplemental oil container, which may preferably be provided. For that purpose preferably a predetermined portion of additional oil is introduced. After a short pause which allows for equalization of heat distribution by mixing, the introduction of oil may be repeated, perhaps several times, until there is a significant decrease in difference between the temperatures indicated by the two temperature sensors. The difference may be, for example, a difference lower than 10° C. normally, and the decision threshold difference value can be set, for example, to 20° C.

The output signals of the temperature sensors are preferably connected to a control unit, such as a computer, which calculates an average value of these signals. The frying time starts when a portion of the formed and cut pieces drop into the frying oil in the frying vessel 17. One of the tasks of the control unit is to integrate the averaged temperature of the frying oil over the frying time, and thereby compute the amount of the introduced energy. When the amount of this computed introduced energy becomes equal to or first exceeds a predetermined constant value, the control unit controls the frying unit 9 to stop the frying process. The control unit thereby controls the interruption of frying, when the basket 8 with the potato pieces will be removed from the hot frying oil in the frying vessel 17.

Frying unit 9 includes preferably a security switch (not shown) functioning on the principle of gas expansion. The security switch cuts off the apparatus in case of technical defects.

At the beginning of the frying process the formed pieces of potato are transferred to the first basket 18 and are held here until about the first half of the corresponding frying time. Then the basket 18 is turned by the revolving of the motor 22, and the potato is transferred into the second basket 19, where the second half of frying takes place. The fully fried potato pieces are subsequently transferred into the finished product dispensing chute (not shown). The use of two baskets 18,19 allows the initiation of frying based on a new order before fully finishing frying of the preceding order.

Use of more than two, such as a plurality of baskets 8, provides enhanced output capacity. This is the case when a machine of high output capacity is desirable, for instance for kitchen or catering purposes. In this embodiment in continuous operation, all positions P1–P4 of the dough making unit and all of the baskets 8 work simultaneously.

The principal solution of frying is based not on the uniform temperature or on constant time, but rather a control unit, such as a computer, controls the amount of energy introduced into the frying system by the simultaneous observation of time and temperature parameters. The control unit or computer equalizes in each cycle the energy amount, for example, from the temperature conditions subsisting at the starting of the cycle. This ensures uniform quality frying of each portion. This feature is important because the given apparatus exerts control in the range of ±10° C. about the optimal operating temperature. This feature compensates not only for the inequalities arising in the actual heating power of the frying oil, but also the inequalities caused by consecutive orders following rapidly upon each other and by random operating cycles. The control unit or computer determines the termination of frying time when the calculated amount of introduced energy becomes equal to or first exceeds a predetermined constant value, which is previously set. This value can be set in most of the cases by an empiric way.

When several baskets 8 are used, also several frying times are to be handled, and the termination of frying times should be separately calculated for the consecutive potato portions, i.e., for each basket 8.

Motors 22, moving baskets 8 and conveyor belt 10 are mounted on the upper housing 28. The conveyor belt 10 may hang on the lower insulated casing 26. While the frying unit of prior art automatic apparatuses could be lifted out and replaced as a whole, the frying unit 9 of the apparatus according to the present invention is constituted from elements that can be lifted out and replaced separately. Thus baskets 8, heating element 15, and the oil recipient frying vessel 17 can be separately handled, pivoted about an axis, then removed. That is an important advantage in view of the considerable weight of frying units which are furnished with heat insulation, and which are handled in the case of traditional automatic apparatuses, by maintenance personal.

In case of a vending machine, a paper cup delivering mechanism can be located on the door of the apparatus (not shown). Paper cups may be arranged in columns and stored until delivery of the finished product. At the delivery point a paper cup dispenser drops the paper cups one by one to the finished product entry point through a tube.

The fried potato leaving the fryer moves, for example, into a trough like finished product dispensing chute (not shown). After detecting the delivery of the paper cup and the presence of the cup in the delivery space, the fried potato is pushed through the introducing aperture in the paper cup dropping tube and from here, gravitates into the paper cup. In order to push the potato through the tube, the finished product dispensing chute may preferably be rotated (raised) about a point of rotation near the paper cup dropping tube by means of a motor. The careful selection of the diameters of the paper cup and of the paper cup dropping tube ensures the waste free dispensation of the product into the paper cup. Preferably, the inner diameter of the dropping tube is slightly larger than the largest outer diameter at the aperture of the paper cup. When the diameter difference is smaller than the smallest diameter of smallest occurring fried potato product, then each piece is dispensed in the paper cup. The finished product is delivered for the consumer through a door on the opposite side of the introducing part of the finished product dispensing chute (not shown).

However, in case of kitchen or catering use, when typically a quite large quantity of the freshly fried potato product is required to be served within a short time, the output of the machine can be different. The consecutive portions of fried potatoes can be collected in a bigger container.

The exhaust system comprises a built in exhaust ventilator 2, a preliminary filter (not shown), and a main filter (not shown) to discharge oil vapor and excess heat from over the frying unit 9.

A main electric unit (not shown) preferably distributes and supplies supply voltage to the units using a main voltage and to the supply unit producing low voltage.

The control unit or means can be, for example, a microcomputer which also generates any further control and check signals required for the operation of the apparatus and allows the coordinated operation of different units.

Further, optional units, like cleaning units (not shown) with a waste water container, or a coin or card accepting unit (not shown), in case of vending machines, can also be applied. The apparatus may be provided with a self-diagnostic system, facilitating the maintenance and serviceability. These, however, will not affect the new features of the machine, namely the frying principle based on integrating the introduced thermal energy, the dough making unit with a still lower plate 20 and a rotary means, and the frying unit 9 with multiple baskets.

The system arrangement constituted from the above described units allows the installation similar to that of the well-known automatic apparatuses, or alternatively as a kitchen machine of high output capacity.

What is claimed is:

1. An automatic apparatus for delivering a fried food product in successive cycles from dehydrated product granulate prepared by rehydration, said apparatus comprising:

a frying unit for frying the food product during each cycle;

at least two temperature sensors positioned within said frying unit and located at different height levels inside the frying unit; and a control unit for controlling a frying time of the food product, said control unit averaging the signals of said at least two temperature sensors during frying to create an averaged temperature and integrating the averaged temperature over the frying time, and thereby computing an amount of introduced energy, wherein said control unit terminates the frying time when said computed introduced energy amount becomes equal to or exceeds a first predetermined constant value.

2. The automatic apparatus of claim 1, wherein said frying unit comprises:

a frying vessel equipped with a frying oil;

a heating element for heating the frying oil; and means for controlling the frying time of the food product in the frying oil during each cycle, wherein said at least two temperature sensors are positioned inside said frying vessel.

3. The automatic apparatus of claim 1, which further comprises a dough making unit for preparing the food product from the dehydrated product granulate, said dough making unit including:

a fixed lower plate;

a rotary member having a rotary axis positioned on the lower plate for rotation thereon, said rotary member having four apertures defined therein, said apertures forming four cups for receiving the dehydrated product granulate for rehydration during each cycle; and means for consecutively rotating the rotary member into a plurality of positions during each cycle.

4. The automatic apparatus of claim 3, wherein an upper surface of said lower plate constitutes the bottom of the four cups in at least one of the plurality of positions and said rotary member is configured and dimensioned to slip upon the upper surface of the lower plate.

5. The automatic apparatus of claim 4, wherein said lower plate includes an opening defining a mold, said plurality of positions comprises four positions during each cycle, and said dough making unit further comprises:

a granulate dispensing mechanism for dispensing granulate into said cups at a first position;

a rehydrating mechanism for rehydrating the dehydrated granulate at a second position;

a first press for compressing said rehydrated granulate at a third position;

a second press for pressing said rehydrated granulate through said mold in at least one phase at a fourth position; and a knife unit for cutting off said pressed rehydrated granulate during each phase after passing through said mold in said fourth position to form said food product, wherein the knife unit is positioned below the mold, and the granulate dispensing mechanism, the rehydrating mechanism, the first press, and the second press are consecutively positioned substantially over said cups such that each cup rotates into each position during each cycle.

6. The automatic apparatus of claim 3, wherein said cups are further defined by an upstanding wall member which surrounds each aperture and are substantially uniformly spaced on the rotary member about the rotary axis.

7. An apparatus for delivering a fried food product in successive cycles from a dehydrated product granulate which is rehydrated, said apparatus comprising:
   a frying unit having a frying vessel equipped with a frying oil for frying the food product;
   at least two baskets positioned within the frying unit and the frying vessel for consecutively receiving said food product;
   a heating element positioned within the frying vessel for heating the frying oil, and means for controlling a frying time of the food product in the frying oil during each successive cycle,
   wherein said means for controlling the frying time computes an amount of introduced energy during the frying time by observing the frying time and a temperature of the frying oil and terminates the frying time when said introduced energy amount becomes equal to or exceeds a first predetermined constant value.

8. The apparatus of claim 7, wherein said means for controlling the frying time comprises:
   at least two temperature sensors positioned within said frying vessel at different height levels therein; and
   a control unit for controlling the frying time by averaging the signals of said temperature sensors during frying to create an averaged temperature and integrating the averaged temperature over the frying time to compute the amount of introduced energy, said control unit terminating the frying time when said computed introduced energy amount becomes equal to or exceeds the first predetermined constant value.

9. The apparatus of claim 7, wherein the at least two baskets are each mounted on shafts which rotate to transfer the food product from at least a first basket to a second basket during each cycle and said means for controlling the frying time controls the rotation of the shafts.

10. The apparatus of claim 7, further comprising a dough making unit for preparing the food product from the dehydrated product granulate, said dough making unit including:
   a fixed lower plate;
   a rotary member positioned on the lower plate, said rotary member having four apertures uniformly spaced around a rotary axis thereof with said apertures forming cups for receiving the dehydrated product granulate; and
   means for consecutively rotating the rotary member about the rotary axis on the lower plate into a plurality of positions,
   wherein an upper surface of said lower plate forms the bottom of the cups in at least one of the plurality of positions with said rotary member being positioned to slip in a substantially tight association upon the upper surface of the lower plate.

11. The apparatus of claim 10, wherein said fixed lower plate includes at least one opening and a mold is positioned within the opening for forming the food product from the rehydrated product granulate.

12. The apparatus of claim 8, which further comprises a frying oil reservoir associated with said frying vessel, wherein the control unit controls the amount of frying oil in the frying vessel by substantially continuously computing the difference between the signals of said temperature sensors and transferring frying oil from the reservoir into the frying vessel when the difference between the signals exceeds a second predetermined constant value.

13. An apparatus for delivering a fried food product in successive cycles from a dehydrated product granulate which is rehydrated, said apparatus comprising:
   a frying unit having a frying vessel equipped with a frying oil for frying the food product;
   at least two baskets positioned within the frying unit and the frying vessel for consecutively receiving said food product;
   a heating element positioned within the frying vessel for heating the frying oil;
   means for controlling a frying time of the food product in the frying oil during each successive cycle; and
   a dough making unit for preparing the food product from the dehydrated product granulate, said dough making unit including:
      a fixed lower plate,
      a rotary member positioned on the lower plate, said rotary member having four apertures uniformly spaced around a rotary axis thereof with said apertures forming cups for receiving the dehydrated product granulate; and
      means for consecutively rotating the rotary member about the rotary axis on the lower plate into a plurality of positions, wherein an upper surface of said lower plate forms the bottom of the cups in at least one of the plurality of positions with said rotary member being positioned to slip in a substantially tight association upon the upper surface of the lower plate,
   wherein said fixed lower plate includes at least one opening and a mold is positioned within the opening for forming the food product from the rehydrated product granulate and said mold includes a mold frame configured and dimensioned for seating within the opening in the lower plate, and a plurality of tensioned, uniformly spaced, parallel wires are attached to said mold frame.

14. An apparatus for delivering a fried food product in successive cycles from a dehydrated product granulate which is rehydrated, said apparatus comprising:
   a frying unit having a frying vessel equipped with a frying oil for frying the food product;
   at least two baskets positioned within the frying unit and the frying vessel for consecutively receiving said food product;
   a heating element positioned within the frying vessel for heating the frying oil;
   means for controlling a frying time of the food product in the frying oil during each successive cycle; and
   a dough making unit for preparing the food product from the dehydrated product granulate said dough making unit including:
      a fixed lower plate;
      a rotary member positioned on the lower plate, said rotary member having four apertures uniformly spaced around a rotary axis thereof with said apertures forming cups for receiving the dehydrated product granulate; and means for consecutively rotating the rotary member about the rotary axis on the lower plate into four positions, wherein an upper surface of said lower plate forms the bottom of the cups in at least one of the plurality of positions with said rotary member being positioned to slip in a substantially tight association upon the upper surface of the lower plate, wherein said fixed lower plate includes at least one opening and a mold is positioned within the opening for forming the food product from the rehydrated product granulate, and said dough making unit further comprises:

a granulate metering mechanism for metering out a portion of granulate into said cups at a first position;

a rehydrating member for adding water to the granulate at a second position;

a first pressing member for pressing the rehydrated granulate into a food product at a third position;

a second pressing member for successively pressing the food product through the mold in at least one phase at a fourth position; and a knife unit for successively cutting off the food product during each phase at the fourth position.

15. The apparatus of claim 14, wherein said rehydrating member is a spray head, the first and second pressing members are configured and dimensioned to substantially fit within an inner dimension of each cup, and the knife unit includes a tensioned wire mounted on a knife unit frame.

16. The apparatus of claim 14, wherein said first pressing member includes a flat pressing surface and said second pressing member has one of a flat or a reliefed pressing surface.

17. An apparatus for delivering a fried food product in successive cycles from a dehydrated product granulate which is rehydrated, said apparatus comprising:

a frying unit having a frying vessel equipped with a frying oil for frying the food product;

at least two baskets positioned within the frying unit and the frying vessel for consecutively receiving said food product;

a heating element positioned within the frying vessel for heating the frying oil;

means for controlling a frying time of the food product in the frying oil during each successive cycle;

a dough making unit for preparing the food product from the dehydrated product granulate, said dough making unit including:

a fixed lower plate;

a rotary member positioned on the lower plate, said rotary member having four apertures uniformly spaced around a rotary axis thereof with said apertures forming cups for receiving the dehydrated product granulate; and means for consecutively rotating the rotary member about the rotary axis on the lower plate into four positions, wherein an upper surface of said lower plate forms the bottom of the cups in at least one of the plurality of positions with said rotary member being positioned to slip in a substantially tight association upon the upper surface of the lower plate; and a conveyor belt for transferring the food product from the dough making unit to the frying unit.

18. An apparatus for delivering a fried food product in successive cycles from a dehydrated product granulate which is rehydrated, said apparatus comprising:

a frying unit having a frying vessel equipped with a frying oil for frying the food product;

at least two baskets positioned within the frying unit and the frying vessel for consecutively receiving said food product;

a heating element positioned within the frying vessel for heating the frying oil; and means for controlling a frying time of the food product in the frying oil during each successive cycle, wherein said frying unit comprises an upper housing and a lower housing, the lower housing houses the frying vessel and is heat-insulated, the frying vessel is removable from the lower housing, the upper housing is mounted on a hinge attached to the lower housing for rotation away from the lower housing in order to allow access to at least the frying vessel, and the heating element is electric and removable from the frying vessel.

\* \* \* \* \*